(No Model.)

E. B. STEPHENS.
ANIMAL TRAP.

No. 506,951. Patented Oct. 17, 1893.

WITNESSES
Jesse Heller.
Phil. C. Masi.

INVENTOR
E. B. Stephens,
by E. W. Anderson,
his Attorney

UNITED STATES PATENT OFFICE.

EBENEZER B. STEPHENS, OF DENVER, COLORADO.

ANIMAL-TRAP.

SPECIFICATION forming part of Letters Patent No. 506,951, dated October 17, 1893.

Application filed March 31, 1893. Serial No. 468,437. (No model.)

*To all whom it may concern:*

Be it known that I, EBENEZER B. STEPHENS, a citizen of the United States, and a resident of Denver, in the county of Arapahoe and State of Colorado, have invented certain new and useful Improvements in Animal-Traps; and I do declare the following to be a full, clear, and exact description of the invention, such as will enable others skilled in the art to which it appertains to make and use the same, reference being had to the accompanying drawings, and to letters of reference marked thereon, which form a part of this specification.

Figure 1:
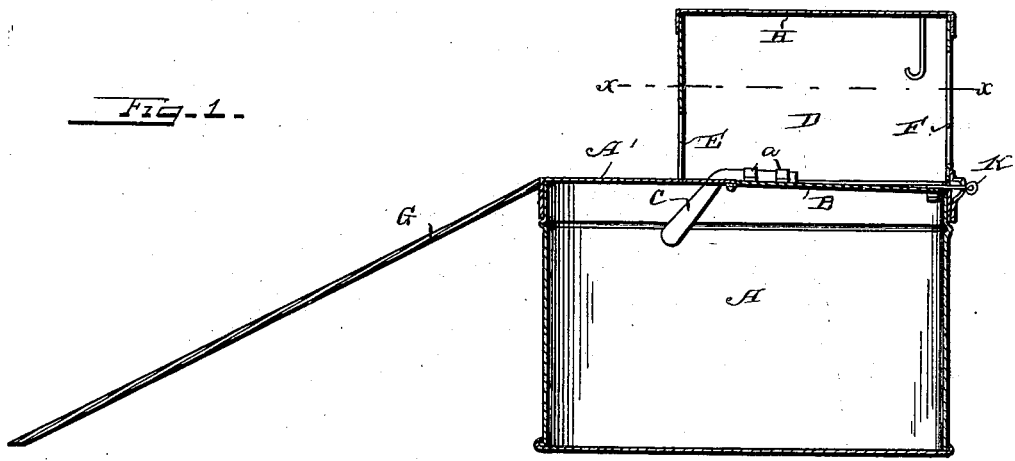
Figure 2:
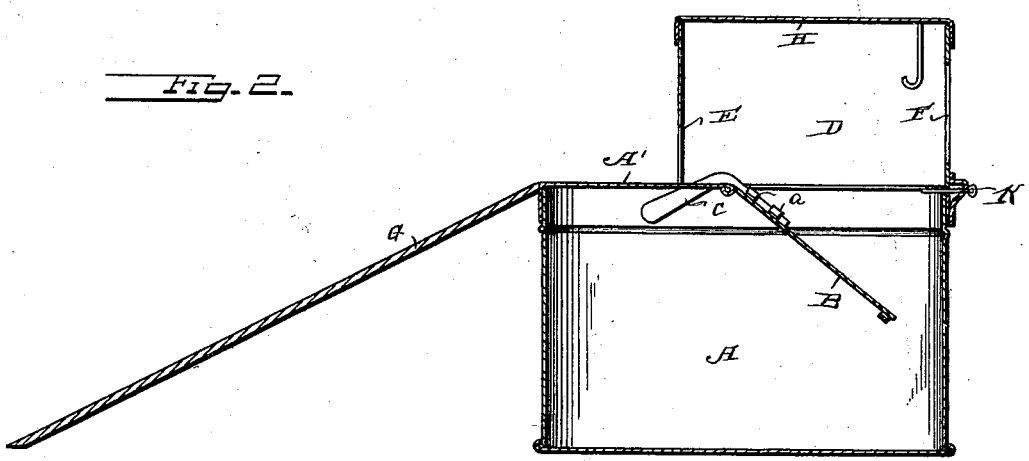
Figure 3:
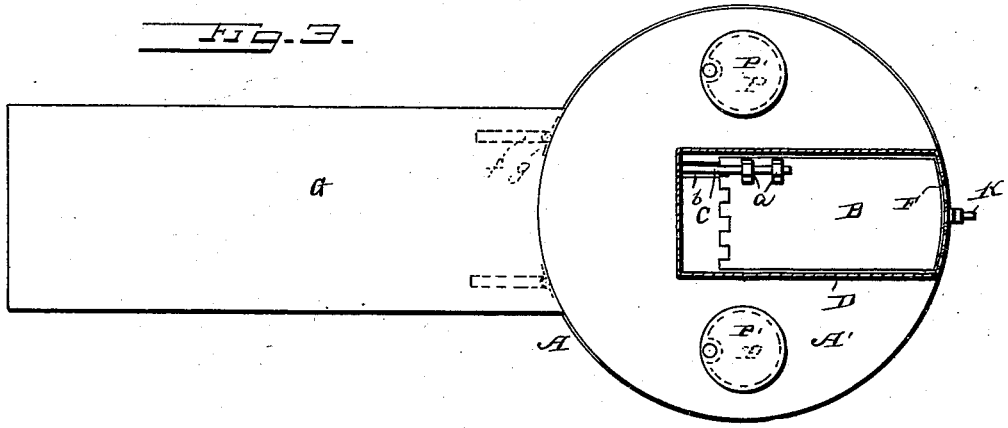

Figure 1 of the drawings is a vertical longitudinal section showing the trap set. Fig. 2 is a similar view showing trap open, and Fig. 3 is a horizontal section of the trap taken on line $x\ x$.

This invention relates to certain new and useful improvements in animal traps, designed especially for rats and mice, the object being to provide a simple and efficient device of this character of new and improved construction; and the invention consists in the novel construction and combination of parts, all as hereinafter specified and pointed out in the claim.

Referring to the accompanying drawings, the letter A designates a box or receptacle which although shown as circular, may be of any suitable shape or form. In the cover A' of this box or receptacle is a hinged trap door B, which is retained in its normal or closed position by means of a weighted angular arm C, one end of which is adjustably held in a loop $a$ on the upper surface of said door, the other end portion extending downwardly into the box or receptacle through a slot $b$ in the cover A'. In place of this weighted arm, it is obvious that I may employ a spring, or weight passing over a pulley, or other well known and suitable counterbalancing device. By adjusting the upper end of the arm C in the loop $a$, it may be given the proper counterbalancing effect.

The object of the trap door, it will be apparent, is to precipitate the animal getting thereon through into the box or receptacle, when the weight will return the door to its normal position flush with the cover; and to entice the animal onto the door, I construct a run-way D, which incloses said door, said runway being about the width of the animal, so that it will not be easy for it to turn around and run back to the entrance hole E at one end thereof. At the end of the run-way, opposite the entrance E, I provide a screen or grating F for the purpose of admitting light to the run-way, and to give the animal the impression that it can pass through the runway at that point, and to induce it to pass onto the trap door and to the bait which is properly placed in the run-way. As the animal disappears through the trap door, a second animal behind will not be frightened away, the disappearance of the first indicating that it has merely passed through the grating.

G is a platform by means of which the animals may run up to the run-way. This platform, if desired, may be separable from the box or receptacle A, and be attached thereto by means of hooks $f, f$, which engage eyes or sockets $g, g$, on the receptacle. The cover H of the run-way may be made removable.

If it is desired to use the trap as a bait only for one or two nights, in order to attract the animals to its vicinity, and induce them to believe the trap to be free from danger, a small pin K may be inserted through the box or receptacle underneath the forward end of the door to prevent its dropping. This when the trap is set is removed, and inserted above the end of the door to prevent the latter from rising above the level of the cover.

Holes P, P, may be made through the cover A' at one or both sides of the run-way, for the purpose of permitting the inspection of the interior, and also to permit water to be poured in to drown the entrapped animals. The holes are covered by pivoted slides P'.

The trap is made the same for both rats and mice, with the exception that it should be of larger size for the former.

Having described this invention, what I claim, and desire to secure by Letters Patent, is—

In an animal trap, a receptacle forming a cage, and having a removable cover, a hinged trap door in said cover, a weighted, counterbalancing arm adjustably attached to said door and projecting down through a slot therein into the receptacle, a narrow, covered runway inclosing said door, an opening in one end of said run-way, a screen or grating forming the other end of said run-way, openings in said cover, slides arranged to close said openings, a platform removably supported at one end upon said receptacle, and a stop pin adapted to be inserted in the receptacle either above or below the free end of said door, substantially as specified.

In testimony whereof I affix my signature in presence of two witnesses.

EBENEZER B. STEPHENS.

Witnesses:
NELLIE WILSON,
WILTON F. SMITH.